United States Patent [19]

Chmiel

[11] Patent Number: 4,751,449
[45] Date of Patent: Jun. 14, 1988

[54] START FROM COAST PROTECTIVE CIRCUIT

[75] Inventor: Steven F. Chmiel, Milwaukee, Wis.

[73] Assignee: PT Components, Inc., Milwaukee, Wis.

[21] Appl. No.: 911,012

[22] Filed: Sep. 24, 1986

[51] Int. Cl.[4] .............................................. H02P 1/44
[52] U.S. Cl. ..................................... 318/786; 318/785
[58] Field of Search ............... 318/785, 786, 778, 779, 318/816, 817, 794, 795

[56] References Cited

U.S. PATENT DOCUMENTS

| | | | |
|---|---|---|---|
| 3,421,064 | 1/1969 | Phillips | 318/786 |
| 4,196,462 | 4/1980 | Pohl | 361/33 |
| 4,604,563 | 8/1986 | Min | 318/786 |
| 4,605,888 | 8/1986 | Kim | 318/785 |
| 4,622,506 | 11/1986 | Shemanske et al. | 318/786 |
| 4,658,195 | 8/1987 | Min | 318/786 |
| 4,670,697 | 6/1987 | Wrege et al. | 318/786 |

Primary Examiner—David Smith, Jr.
Attorney, Agent, or Firm—Andrus, Sceales, Starke & Sawall

[57] ABSTRACT

Blanking interval circuitry (106, 108, 110, 104) is disclosed for preventing immediate connection of the start capacitor (5) of an AC motor to the AC source (4) upon energization of the motor, to protect the motor against an overcurrent condition if the motor is de-energized while in the running mode and then re-energized while still coasting above a given speed, and to particularly prevent burn out of the start capacitor (5) and/or start switch (10) upon reapplication of electrical power after a momentary power outage. The start capacitor (5) is disconnected from the AC source (4) during a time delay blanking interval regardless of whether auxiliary winding voltage is above or below a given cut-in value relative to main winding voltage as a function of motor speed corresponding to a given cut-in speed. After the time delay blanking interval, a cut-in comparator (86) actuates start switch circuitry (54, 10) to connect the start capacitor (5) through the auxiliary winding (2) to the AC source (4) only if auxiliary winding voltage has dropped to or below the cut-in value.

4 Claims, 2 Drawing Sheets

START FROM COAST PROTECTIVE CIRCUIT

BACKGROUND AND SUMMARY

The invention relates to control systems for disconnect or start switches for use with the start or auxiliary winding of a single phase AC induction motor. The invention particularly relates to continuing development efforts regarding the circuitry shown in commonly owned co-pending allowed U.S. application Ser. No. 680,489, filed Dec. 11, 1984, "Load And Speed Sensitive Motor Control Starting Circuit", Shemanske et al, hereby incorporated herein by reference.

A single phase AC induction motor has a main winding for running the motor, and a start or auxiliary winding for starting the motor. The auxiliary winding is energized when starting the motor from rest and then disconnected at a given motor speed. The fields in the main and auxiliary windings are phase shifted, for example by capacitance, inductance, resistance or the like, to establish a rotating magnetic field for starting and/or running torque. The circuitry of the present invention is useful for capacitor start/run motors, and also for capacitor start only motors, especially those of higher rating, e.g., greater than 2 horsepower.

The present invention addresses a potential problem when restarting the motor from a coasting or running condition. For example, during a momentary power outage, the motor is de-energized but continues to rotate, i.e., coast, particularly in high inertial load applications. If electrical power is then re-applied to both the main winding and the start winding and start capacitor and/or run capacitor, an over-current condition may occur, damaging the capacitor and/or start switch in particular. If electrical power is re-applied to the auxiliary winding and start capacitor during this coasting condition, excessive current may flow through the capacitor and through the start switch. Burned out start and/or run capacitors and start switches may result from temporary power outages.

The present invention addresses and solves the above noted problem, and protects against an over-current condition if the motor is de-energized while in the running mode and then re-energized while still coasting above a given speed.

DETAILED DESCRIPTION

Figure 1:
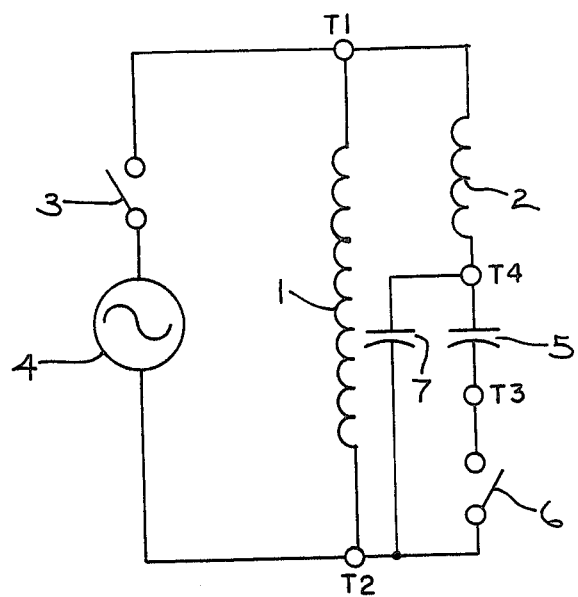
FIG. 1 schematically shows a typical environment in which the preferred embodiment of the invention is used.

FIG. 1 shows main winding 1 and auxiliary winding 2 of a single phase AC induction motor connectable through a main switch 3 to an AC power source 4. Capacitors 5 and 7 provide the phase shift for starting torque. Start switch 6 automatically connects and disconnects start capacitor 5 from AC source 4 in starting and running modes, respectively. When the motor reaches a given threshold or cut-out speed, switch 6 is opened to disconnect start capacitor 5 from AC power source 4.

Figure 2:
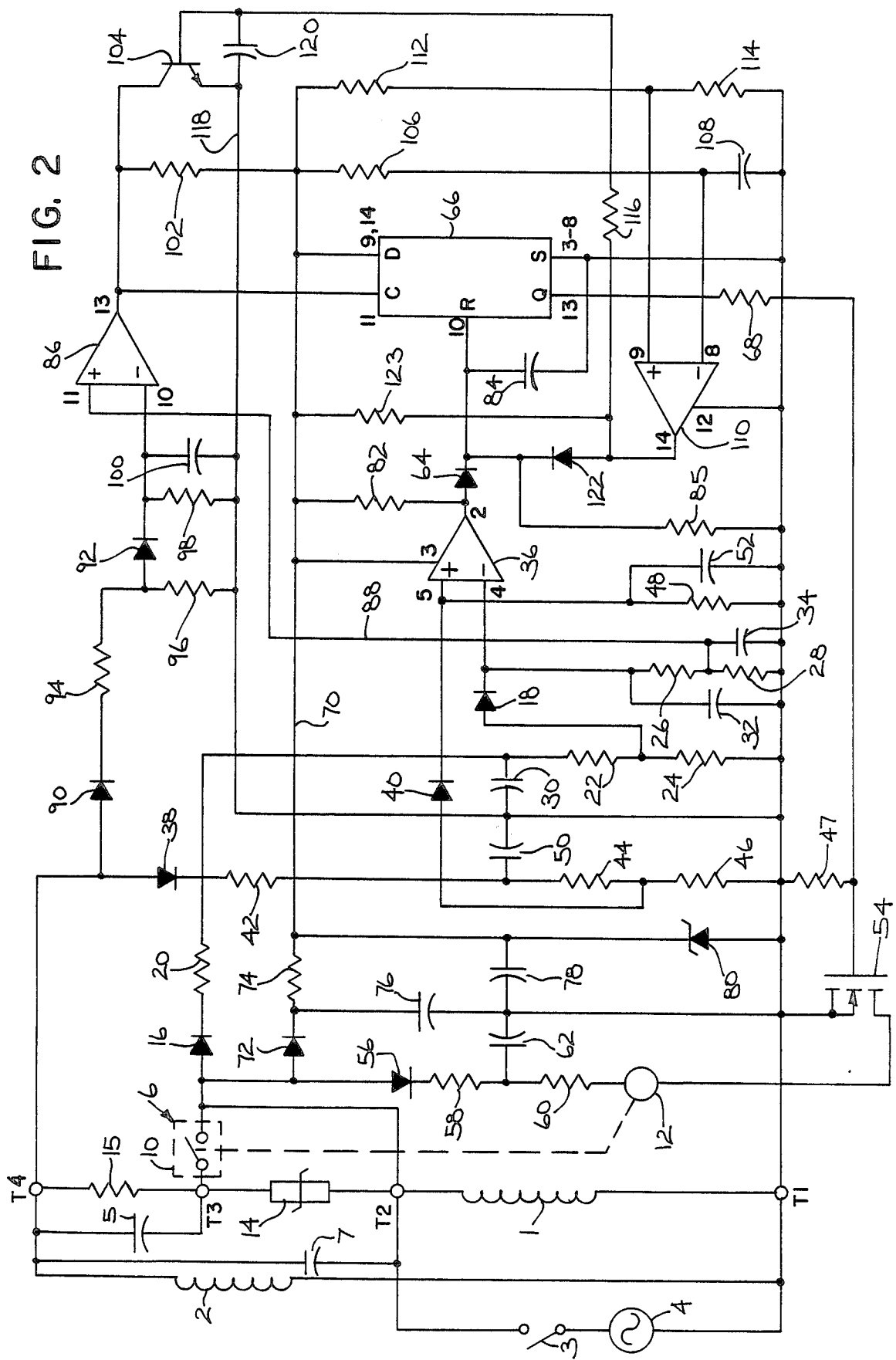
FIG. 2 is a circuit diagram illustrating circuitry constructed in accordance with the invention.

FIG. 2 shows circuitry in accordance with the invention for controlling start switch 6. Switch 6 is a solid state relay, such as an H12CD4890, having a power switch section 10 connected between terminals T2 and T3, and a trigger section 12 for controlling conduction of power switch 10. An MOV 14 may be connected between terminals T2 and T3 in parallel with switch 10 to provide transient protection for the latter. Main winding 1 is connected between terminals T1 and T2. Auxiliary winding 2 is connected between terminals T1 and T4. Start capacitor 5 is connected between terminals T4 and T3. Run capacitor 7 is connected between T2 and T4. Switch 6 can alternatively be implemented with thyristors. Resistor 15 is connected between terminals T4 and T3 and provides faster discharge of start capacitor 5 after cut-out, to reduce the voltage across switch 10 and extend the life of the latter.

Main and auxiliary winding voltage detector circuitry is provided. Main winding voltage is rectified through diode 16 and further rectified through diode 18, reduced by resistors 20, 22, 24, 26 and 28, and filtered by capacitors 30, 32 and 34, and supplied to the minus input as a reference input of voltage comparator 36 which is one-fourth of a quad comparator, such as an LM339 integrated circuit where manufacturer assigned pin number designations are shown for clarity. Auxiliary winding voltage is half wave rectified through diode 38 and further rectified through diode 40, reduced by resistors 42, 44, 46 and 48, and filtered by capacitors 50 and 52 and supplied to the plus input pin 5 as a comparing input of voltage comparator 36.

During the starting mode, to be further described, power switch 10 is triggered into conduction by element 12 and connects start capacitor 5 and auxiliary winding 2 to AC source 4. FET 54 is conductive and completes a circuit from terminal T2 through diode 56, resistors 58 and 60 as filtered by capacitor 62, through trigger element 12 and conductive FET 54 to terminal T1 and AC source 4. During the starting mode when the auxiliary winding voltage at pin 5 of comparator 36 rises to a given cut-out value relative to the main winding voltage at pin 4 of comparator 36 as a function of motor speed, corresponding to a given cut-out speed, the output of comparator 36 at pin 2 goes high. This high signal is supplied through diode 64 to the reset input at pin 10 of flip flop 66 such as a MC14013B integrated circuit. The high state at reset input pin 10 of flip flop 66 drives the Q output at pin 13 low, which low signal through resistor 68 turns off FET 54, which in turn stops conduction though trigger element 12, which in turn turns off power switch 10, disconnecting start capacitor 5 from AC source 4 and auxiliary winding 2. The motor is now in a running mode.

A half wave rectified DC power supply is supplied on bus 70 for the noted comparator and flip flop. The voltage at terminal T2 is half wave rectified by diode 72, reduced by resistor 74, filtered by capacitors 76 and 78, and clamped by zener diode 80, to provide the voltage on bus 70. Resistor 82 is a pull-up resistor. Capacitor 84 and resistor 85 provide filtering for the reset input of flip flop 66.

Voltage comparator 86 is another fourth of the noted LM339 and compares main winding voltage at plus input pin 11 against auxiliary winding voltage at minus input pin 10. The main winding voltage is supplied through diodes 16, 18 and line 88. The auxiliary winding voltage is supplied through diodes 90 and 92, reduced by resistors 94, 96 and 98, and filtered by capacitor 100. During the running mode of the motor with start capacitor 5 disconnected from AC source 4, there is a voltage appearing across auxiliary winding 2, a component of which is due to motor rotation. When this auxiliary winding voltage at pin 10 of comparator 86 drops to a given cut-in value relative to the main winding voltage at pin 11 as a function of motor speed, corresponding to a given cut-in speed, the output of comparator 86 at pin 13 goes high. The cut-in motor speed is lower than the cut-out motor speed. The high signal at output pin 13 of comparator 86 clocks flip flop 66 at pin 11 to drive the Q output at pin 13 high, which high signal through resistor 68 turns on FET 54, which in turn completes the noted circuit through trigger element 12 which turns on power switch 10 to reconnect start capacitor 5 through the auxiliary winding 2 to AC source 4, to restart the motor from a stall or overload condition. Resistor 47 provides gate to source protection for FET 54. Resistor 102 is a pull-up resistor.

In accordance with the invention, a protective circuit is provided for preventing the start winding circuit, including start capacitor 5 and auxiliary winding 2, from being energized when the motor is coasting at a high RPM without power due to an inertial load. Upon energization of the motor, either initial energization by closure of switch 3 or re-energization of the motor after a momentary power loss, a blanking interval is provided which prevents immediate connection of start capacitor 5 through auxiliary winding 2 to AC source 4, to protect against an overcurrent condition.

Blanking interval circuitry includes a disabling switch provided by bipolar transistor 104 and an RC timing circuit including resistor 106 and capacitor 108 charged by the voltage from AC source 4 across main winding 1 upon energization of the motor. In the disclosed embodiment, capacitor 108 charges to a given switching level in a time delay blanking interval of 50 milliseconds.

A voltage comparator 110, which may be another fourth of the noted LM339 chip, compares at minus input pin 8 the voltage from AC source 4 on line 70 delayed by RC circuit 106, 108 against the voltage from AC source 4 on line 70 as reduced by the voltage divider network provided by resistors 112 and 114 and supplied to plus input pin 9 of comparator 110. During the blanking interval while capacitor 108 is charging, the voltage at input pin 8 of comparator 110 is less than a given switching value relative to the voltage at input pin 9, and the output of comparator 110 at pin 14 is high, which high signal is supplied through resistor 116 to the base of transistor 104 such that the latter is biased into conduction to complete a short circuit from output pin 13 of comparator 86 to a common return bus 118 relative to the AC source and returned to terminal T1. Capacitor 120 delays the turn off of transistor 104 so that the reset terminal R at pin 10 of flip flop 66 can go low before the clock, terminal C at pin 11 of flip flop 66, goes high. Because of the short circuit through conducting transistor 104, output pin 13 of comparator 86 is shorted or tied low regardless of whether the voltage at input pin 11 is greater than the noted given cut-in value relative to the voltage at input pin 10. This in turn forces a low input at the clock input pin 11 of flip flop 66, preventing clocking of the latter, whereby the Q output at pin 13 is low and FET 54 is off and trigger element 12 and start switch 10 are OFF, such that start capacitor 5, through auxiliary winding 2, cannot be connected to AC source 4 during such blanking interval. The high signal at output pin 14 of comparator 110 is also supplied through diode 122 to the reset input at pin 10 of flip flop 66, which high reset signal drives the output Q at pin 13 low, to further ensure the noted OFF condition of start switch 10. Resistor 123 is a pull-up resistor.

When capacitor 108 charges to a given switching value, preferably 50 milliseconds after energization of the motor whether from rest or while coasting, the voltage at input pin 8 of comparator 110 rises to a given switching value relative to the voltage at input pin 9, and the output of comparator 110 at pin 14 goes low. This low signal is supplied through diode 122 to the reset input at pin 10 of flip flop 66, enabling the reset function to be performed by cut-out comparator 36 through diode 64 when the auxiliary winding voltage at input pin 5 of comparator 36 rises to the noted cut-out value relative to the main winding voltage at input pin 4 as a function of motor speed. The low signal at output pin 14 of comparator 110 is also supplied through resistor 116 to turn off transistor 104 and remove the short circuit from output pin 13 of comparator 86. This enables the clocking function at pin 11 of flip flop 66 to be controlled by cut-in comparator 86 when the auxiliary winding voltage at input pin 10 of comparator 86 drops to the given cut-in value relative to the main winding voltage at input pin 11 of comparator 86.

The blanking interval allows the cut-in and cut-out voltage detection and comparison circuitry to determine whether or not the start capacitor 5 should be connected to AC source 4 through auxiliary winding 2. The blanking interval circuitry prevents connection of start capacitor 5 through auxiliary winding 2 to AC source 4 during the time delay blanking interval. At the end of such interval, if motor speed is at cut-in or below, there will be low auxiliary winding voltage at input pin 10 of comparator 86 and hence output pin 13 of comparator 86 will be high which will clock flip flop 66 and drive its Q output high which turns on start switch 10 to connect start capacitor 5 through auxiliary winding 2 to AC source 4, to restart the motor. Likewise, if power has been interrupted while the motor is in a running mode and if the motor coasting speed has slowed sufficiently to a low enough speed when electrical power is reapplied, then the auxiliary voltage at input pin 10 of comparator 86 will be at a value lower than the cut-in value relative to the main winding voltage at input pin 11 of comparator 86, and output pin 13 of comparator 86 will be high, thus clocking flip flop 66 and driving its Q output high which turns on start switch 10 to reconnect start capacitor 5 and auxiliary winding 2 to restart the motor. However, if power has been interrupted while the motor is in a running mode and if the motor coasting speed has not slowed sufficiently when electrical power is reapplied, then the auxiliary winding voltage at input pin 10 of comparator 86 will be above the given cut-in value relative to the main winding voltage at input 11 of comparator 86, such that output pin 13 of comparator 86 will be low, and hence flip flop 66 will not be clocked, and hence the Q output at pin 13 will be low, whereby FET 54 is off and trigger element 12 and switch 10 are off, and hence start capacitor 5 is not connected to AC source 4 through auxiliary winding 2.

The comparator circuitry prevents reconnection of start capacitor 5 to AC source 4 during coasting of the motor until auxiliary winding voltage drops to the cut-in value relative to main winding voltage. The blanking interval circuitry provides a given time delay blanking interval after energization of the motor, whether at rest or coasting. Transistor 104 disables the clock input at pin 11 of flip flop 66 during the time delay blanking interval such that start capacitor 5 is disconnected from AC source 4 during the blanking interval regardless of whether auxiliary winding voltage is above or below the noted cut-in value relative to main winding voltage. After the time delay blanking interval, the comparator circuitry actuates start switch 10 to connect start capacitor 5 through auxiliary winding 2 to AC source 4 only if auxiliary winding voltage has dropped to or below the cut-in value relative to main winding voltage. The RC timing circuit 106, 108 disables the output of comparator 86 during the blanking interval, and enables the output of comparator 86 after the blanking interval. The control or base terminal of the disabling transistor switch 104 is coupled to the RC timing circuit 106, 108 through comparator 110. Disabling transistor switch 104 is biased into conduction by the RC timing circuit during the blanking interval to short circuit the output of comparator 86 to common return 118 and disable any turn-on signal from the output of comparator 86. The on condition of transistor 104 disables turn-on of start switch 10. The off condition of transistor 104 enables turn-on of start switch 10. Flip flop 66 responds to cut-in voltage comparator 86 to output a turn-on signal at its Q output through resistor 68 to the start switch circuitry if transistor 104 is off and if auxiliary winding voltage at input pin 10 of comparator 86 is at or below the cut-in value relative to the main winding voltage at input pin 11 of comparator 86.

It is recognized that various equivalents, alternatives and modifications are possible within the scope of the appended claims.

I claim:

1. In a single phase AC induction motor having a main winding and an auxiliary winding both connectable to an AC power source, and having a start capacitor for providing a phase shifted field for starting torque, and having start switch means for automatically connecting and disconnecting said start capacitor to and from said AC source in starting and running modes, respectively, a control circuit comprising:
   main voltage detector means for sensing main winding voltage;
   auxiliary voltage detector means for sensing auxiliary winding voltage;
   cut-out voltage comparator means responsive to said main and auxiliary voltage detector means and generating a turn-off signal when auxiliary winding voltage rises to a given cut-out value relative to main winding voltage as a function of motor speed corresponding to a given cut-out speed;
   logic means responsive to said turn-off signal from said cut-out voltage comparator means to turn off said start switch means to disconnect said start capacitor from said AC source;
   cut-in voltage comparator means responsive to said main and auxiliary voltage detector means and generating a turn-on signal to said logic means when said auxiliary winding voltage decreases to a given cut-in value relative to main winding voltage as a function of motor speed corresponding to a given cut-in speed, said logic means being responsive to said turn-on signal to turn-on said start switch means to connect said start capacitor to said AC source;
   power supply means coupled to said AC source;
   blanking interval means comprising disabling switch means coupled to said logic means, and RC timing means including a capacitor charged by voltage from said power supply means upon energization of said motor and actuating said disabling switch means from a first to a second condition after a given time delay blanking interval during which said capacitor is charged to a given switching value of said disabling switch means, said first condition of said disabling switch means disabling turn-on of said start switch means, said second condition of said disabling switch means enabling turn-on of said start switch means by said cut-in voltage comparator means if said auxiliary winding voltage is at or below said given cut-in value corresponding to said cut-in speed, such that said blanking interval means prevents immediate connection of said start capacitor to said AC source upon energization of said motor to protect against an over-current condition if said motor is de-energized while in said running mode and then re-energized while still coasting above said cut-in speed, and such that said start capacitor is disconnected from said AC source during said time delay blanking interval regardless of whether said start auxiliary winding voltage is above or below said given cut-in value corresponding to said cut-in speed, and such that after said time delay blanking interval said cut-in comparator means actuates said start switch means to connect said start capacitor to said AC source only if said auxiliary winding voltage has dropped to said given cut-in value corresponding to said cut-in speed.

2. The invention according to claim 1 wherein said logic means comprises flip flop means responsive to said cut-out voltage comparator means to output a turn-off signal to said start switch means to disconnect said start capacitor from said AC source when auxiliary winding voltage rises to said given cut-out value corresponding to said cut-out speed, said flip flop means being responsive to said cut-in voltage comparator means to output a turn-on signal to said start switch means if said disabling switch means is in said second condition and said auxiliary winding voltage is at or below said given cut-in value corresponding to said cut-in speed.

3. The invention according to claim 2 wherein said disabling switch means comprises a transistor having a base controlled by said RC timing means and a collector-emitter controlling said turn-on signal to said start switch means.

4. The invention according to claim 3 wherein said power supply means provides a half wave rectified DC voltage, and wherein said blanking interval means comprises comparator means having a first input from said power supply means and a second input connected to said power supply means through said RC timing means, said last mentioned comparator means having an output connected to the output of said cut-out comparator means and to said base of said transistor, one of the base and emitter of said transistor being connected to the output of said cut-in comparator means, the other of the base and emitter of said transistor being connected to a common return relative to said AC source, such that said output of said cut-in comparator means is short circuited to said common return when said transistor is biased into conduction.

* * * * *